US012337461B2

(12) United States Patent
Denenberg

(10) Patent No.: US 12,337,461 B2
(45) Date of Patent: Jun. 24, 2025

(54) TOOLBOX

(71) Applicant: Dmitry Denenberg, Morton Grove, IL (US)

(72) Inventor: Dmitry Denenberg, Morton Grove, IL (US)

( * ) Notice: Subject to any disclaimer, the term of this patent is extended or adjusted under 35 U.S.C. 154(b) by 106 days.

(21) Appl. No.: 18/211,543

(22) Filed: Jun. 19, 2023

(65) Prior Publication Data

US 2024/0416501 A1 Dec. 19, 2024

(51) Int. Cl.
*B25H 3/02* (2006.01)
*B65D 25/32* (2006.01)

(52) U.S. Cl.
CPC ............. *B25H 3/021* (2013.01); *B65D 25/32* (2013.01)

(58) Field of Classification Search
None
See application file for complete search history.

(56) References Cited

U.S. PATENT DOCUMENTS 2,472,028 A * 5/1949 Son ........................... A61L 2/26 422/310
3,390,810 A 7/1968 Schneeweiss
3,493,102 A * 2/1970 Belokin, Jr. ........... B25H 3/023 312/328
3,870,149 A * 3/1975 Huot ...................... B25H 3/003 206/379
4,303,158 A 12/1981 Perkins
4,460,085 A 7/1984 Jantzen
4,550,828 A 11/1985 Baldwin
4,880,122 A * 11/1989 Martindell ............. B25H 3/003 206/374
5,011,013 A 4/1991 Meisner
5,172,810 A * 12/1992 Brewer .................... A61C 3/04 206/759
5,190,154 A * 3/1993 Reusch .................. B25H 3/003 206/375
5,195,636 A * 3/1993 Wridt ....................... B25H 3/06 220/770
5,312,250 A * 5/1994 Ellman .................. A61B 50/00 206/379
5,490,975 A * 2/1996 Dane .......................... A61L 2/26 206/439
5,505,303 A * 4/1996 Sirman .................... B25H 3/02 206/349
5,562,208 A * 10/1996 Hasler ....................... B25F 1/00 206/373
5,711,428 A * 1/1998 Ho ......................... B25H 3/003 206/759
5,931,318 A * 8/1999 Shauo ...................... B25H 3/06 312/902
6,467,618 B2 * 10/2002 High ...................... B65D 85/00 206/370

(Continued)

FOREIGN PATENT DOCUMENTS

WO WO2011089598 7/2011

*Primary Examiner* — Mollie Impink

(57) ABSTRACT

A toolbox apparatus for portably storing tools includes a container with a pivoting holder positioned on one side of the container. The pivoting holder is shaped to hold a plurality of elongated tools in vertical orientations when upright and is pivotable rearwardly to tilt the elongated tools downwardly, thus compacting the toolbox apparatus such that the toolbox apparatus may be storied in a shorter space.

11 Claims, 8 Drawing Sheets

(56) References Cited

U.S. PATENT DOCUMENTS 6,615,983 B1 * 9/2003 Yu .......................... B25H 3/003 206/378
6,942,095 B2 * 9/2005 Chen ...................... B25H 3/003 206/372
6,953,114 B2 * 10/2005 Wang ..................... B25H 3/003 206/375
RE38,905 E * 12/2005 Wei ........................ B25H 3/003 312/902
7,249,676 B2 * 7/2007 Wang ..................... B25H 3/003 206/747
7,331,455 B2 * 2/2008 Lin ........................ B25H 3/003 206/378
7,357,250 B2 * 4/2008 Hagemann ............. A01K 97/06 206/315.11
7,401,700 B2 * 7/2008 Dost ...................... B25H 3/003 206/372
7,434,688 B2 * 10/2008 Hu ......................... B25H 3/023 206/379
7,510,078 B2 3/2009 Schmidt
7,530,459 B2 * 5/2009 Yeh .......................... B25H 3/02 312/902
7,931,143 B1 * 4/2011 Lin ........................ B25H 3/021 220/629
8,851,282 B2 10/2014 Brunner
9,694,489 B2 * 7/2017 Steele .................. B65D 25/205
10,710,235 B1 * 7/2020 Cantlon ................. B25H 3/025
D938,723 S 12/2021 Olson
11,491,637 B2 * 11/2022 Miley .................... B25H 3/023
2004/0200749 A1 * 10/2004 Wang ..................... B25H 3/003 206/349
2004/0256336 A1 * 12/2004 Ling ........................ B25H 3/04 211/70.6
2005/0056559 A1 * 3/2005 Chen ...................... B25H 3/003 206/372
2005/0241974 A1 * 11/2005 Chen ...................... B25H 3/003 206/349
2008/0067095 A1 3/2008 Mueller
2009/0266730 A1 * 10/2009 Lin ........................ B25H 3/003 206/372
2011/0233089 A1 * 9/2011 Verk ........................ B25H 3/04 206/379

* cited by examiner

TOOLBOX

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to toolboxes and more particularly pertains to a new toolbox for portably storing tools.

(2) Description of Related Art Including Information Disclosed Under 37 CFR 1.97 and 1.98

Myriad toolboxes are disclosed by the prior art, but the prior art does not describe a toolbox with a pivoting holder for holding a plurality of elongated tools in vertical orientations when the pivoting holder is oriented upright. Such an apparatus is advantageous over the prior art because the pivoting holder may be pivoted to tilt the elongated tools downwardly and fit the toolbox with the elongated tools in a shorter space than would otherwise be achievable.

BRIEF SUMMARY OF THE INVENTION

An embodiment of the disclosure meets the needs presented above by generally comprising a container having a base wall, a pair of lateral walls, and a rear wall. Each of the rear wall and the pair of lateral walls is coupled to and extends upwardly from the base wall. The rear wall is coupled to and extends between the pair of lateral walls. A pivoting holder is coupled to the container. The pivoting holder is spaced forwardly of the rear wall with respect to the container and extends between the pair of lateral walls. The pivoting holder defines a front slot therein which has an open top. The front slot has a size such that the pivoting holder is configured for holding a plurality of elongated tools in vertical orientations. The pivoting holder and the rear wall define an interior space therebetween. The pivoting holder is pivotable with respect to the container and is positionable in a raised position defined by the pivoting holder extending vertically upwardly from the base wall. The pivoting holder is pivotable rearwardly and downwardly with respect to the container from the raised position such that the pivoting holder forms an acute angle between the base wall the pivoting holder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
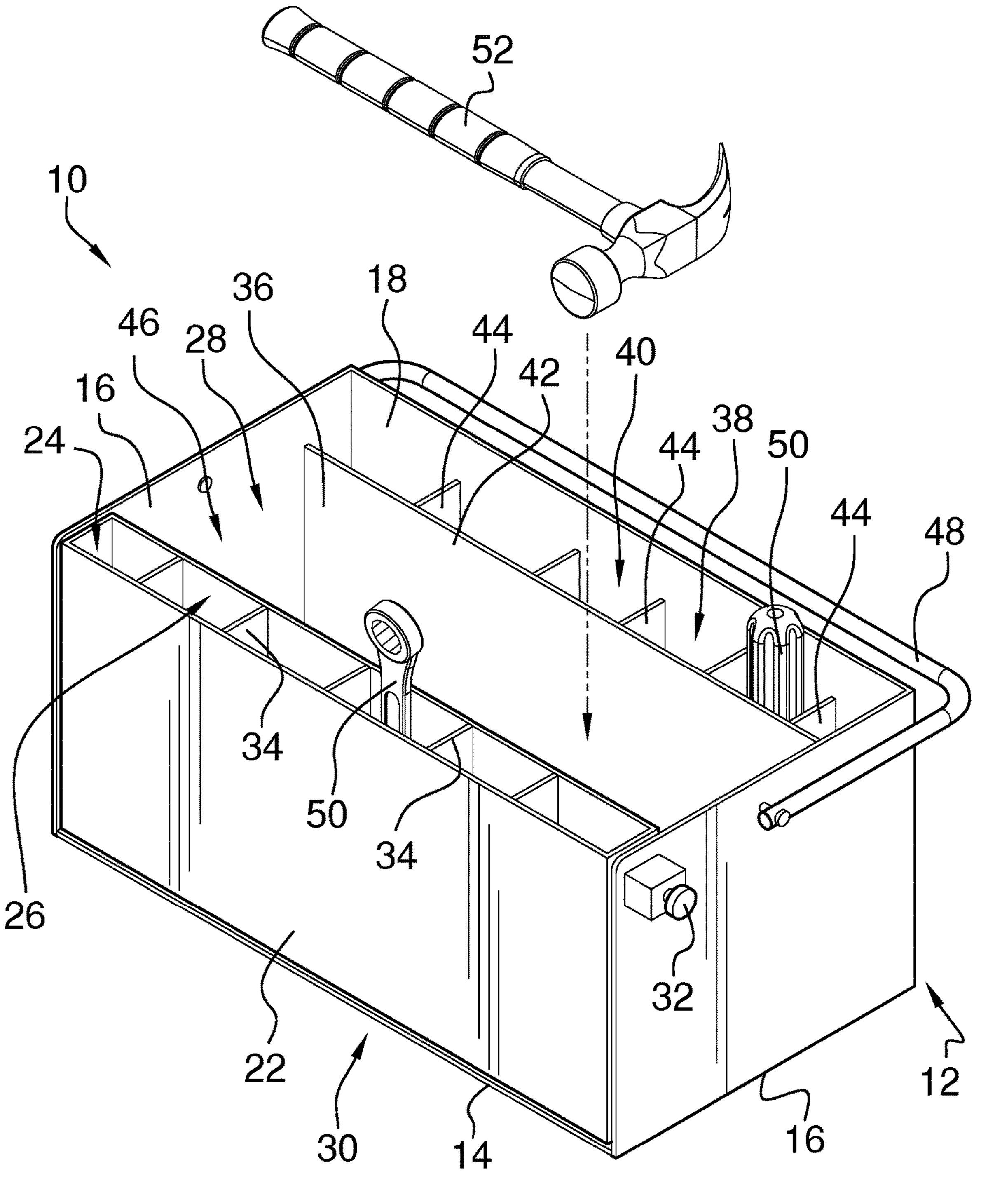
FIG. 1 is a top perspective in-use view of a toolbox apparatus according to an embodiment of the disclosure.
Figure 2:
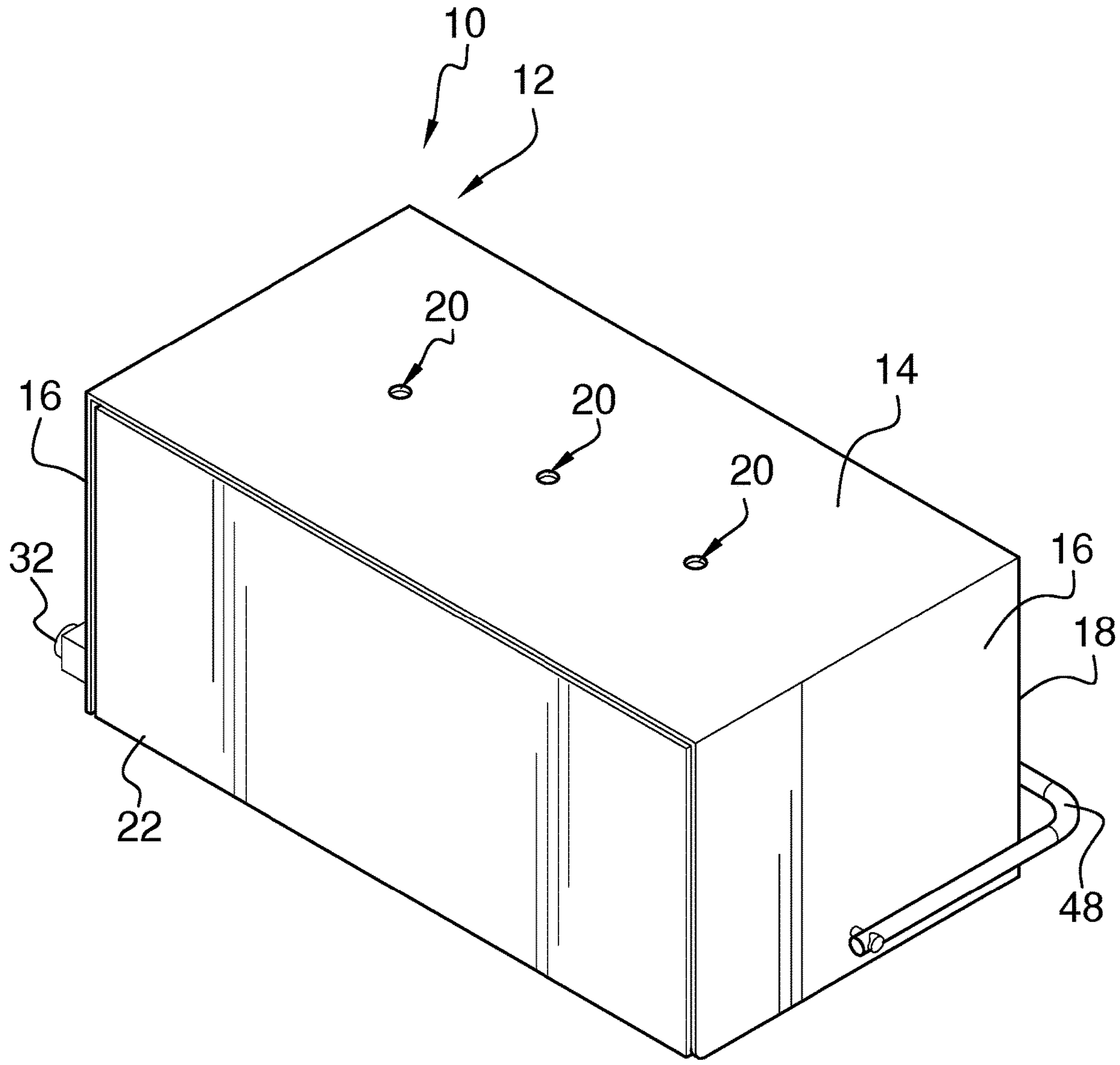
FIG. 2 is a bottom perspective view of an embodiment of the disclosure.
Figure 3:
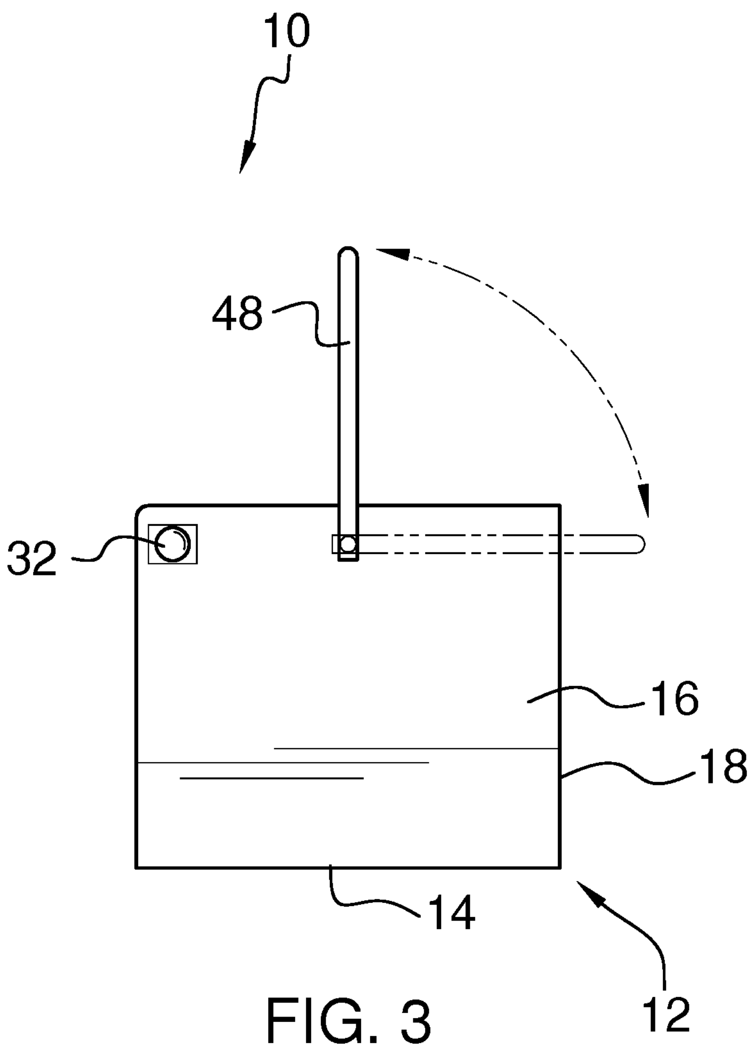
FIG. 3 is a side view of an embodiment of the disclosure.
Figure 4:
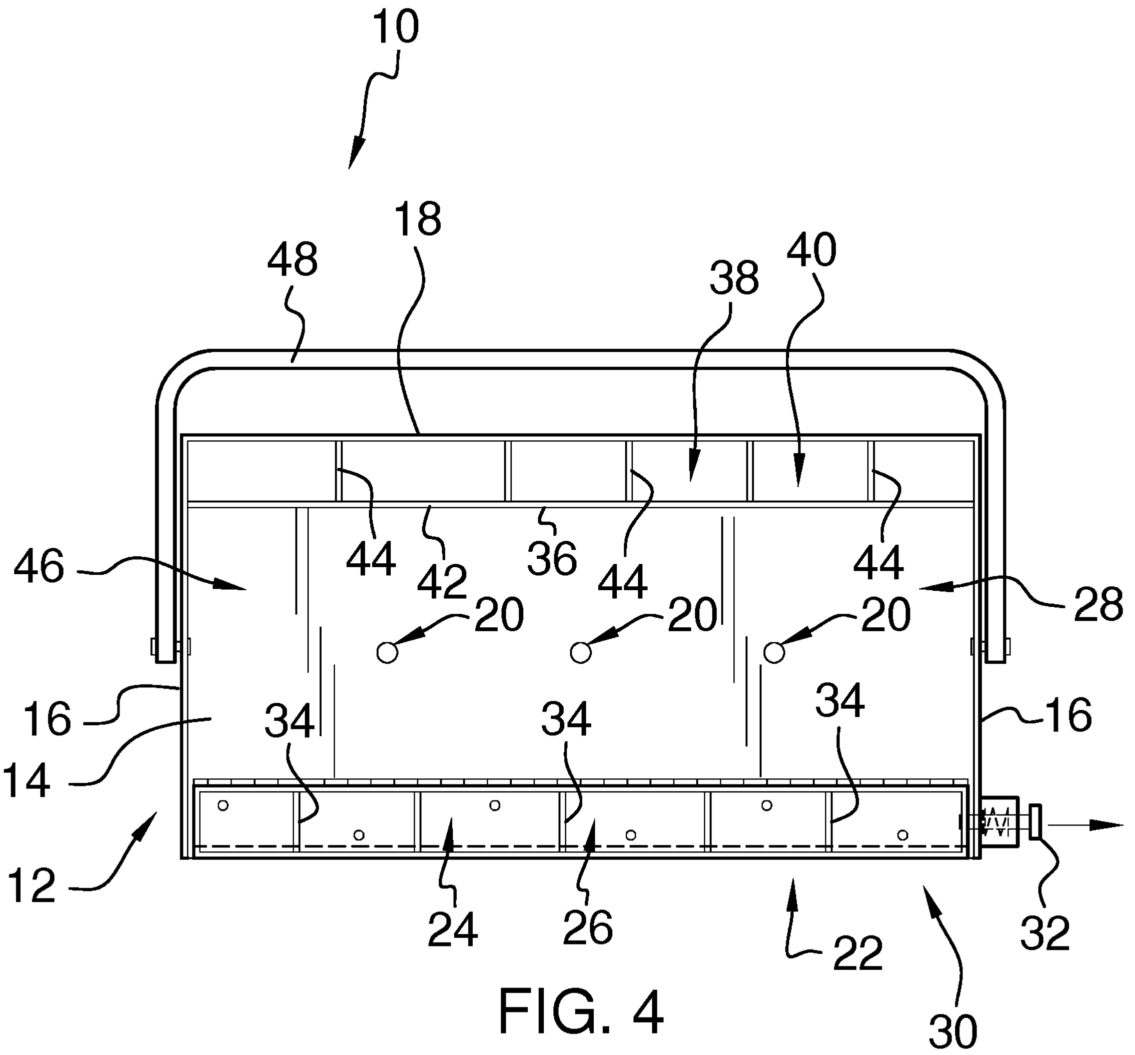
FIG. 4 is a top view of an embodiment of the disclosure.
Figure 5:
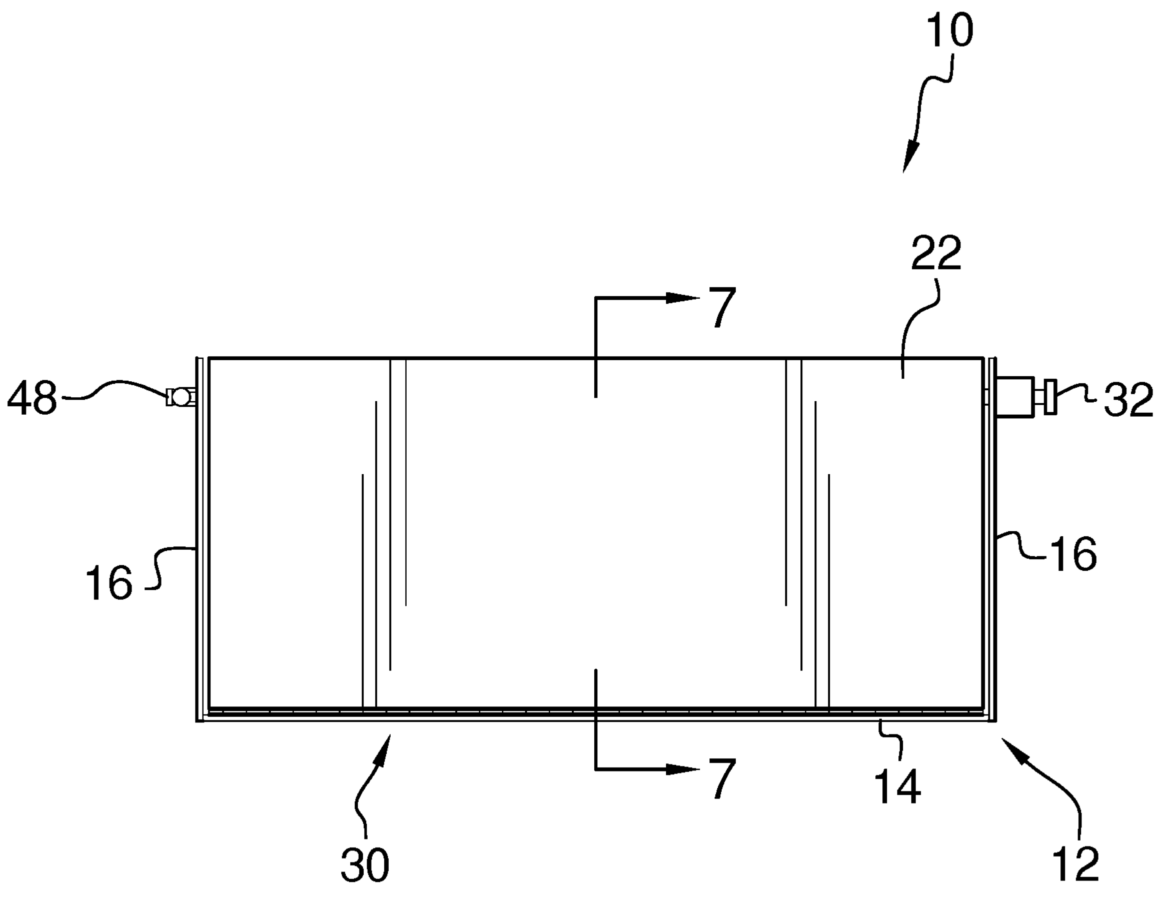
FIG. 5 is a front view of an embodiment of the disclosure illustrating a pivoting holder in a raised position.
Figure 6:
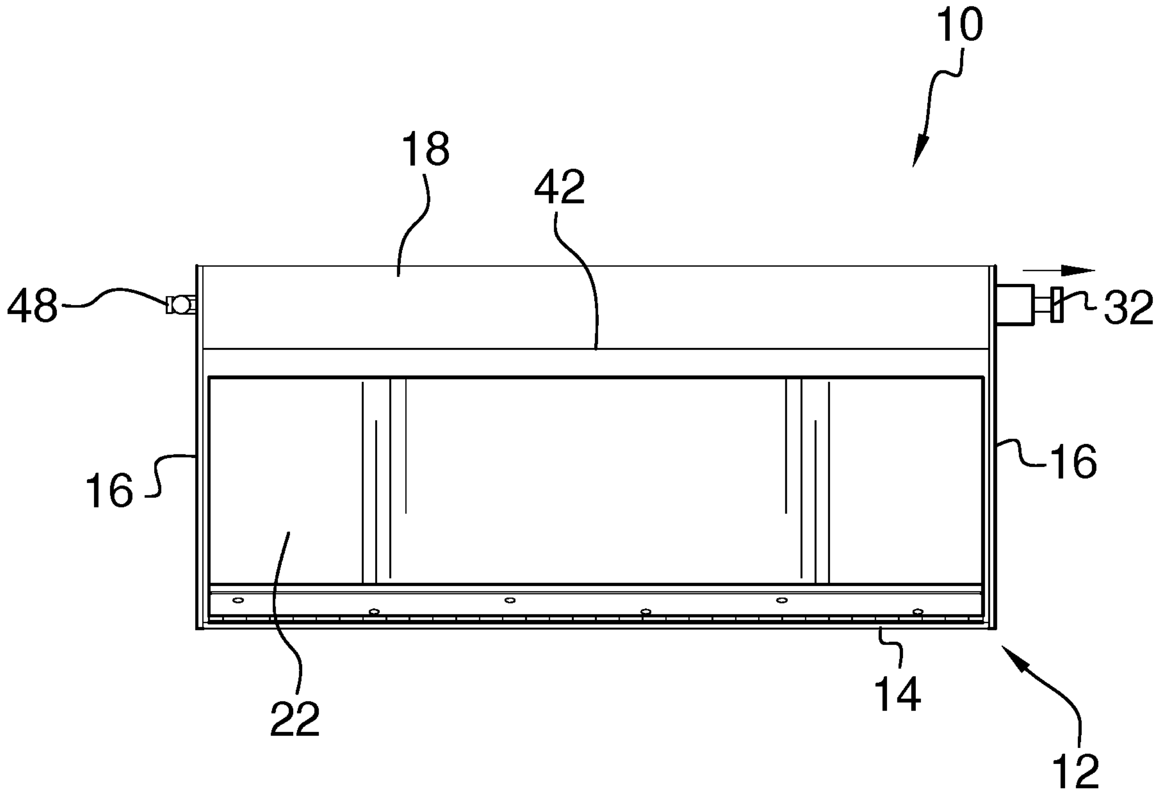
FIG. 6 is a front view of an embodiment of the disclosure illustrating the pivoting holder pivoting rearwardly from the raised position.
Figure 7:
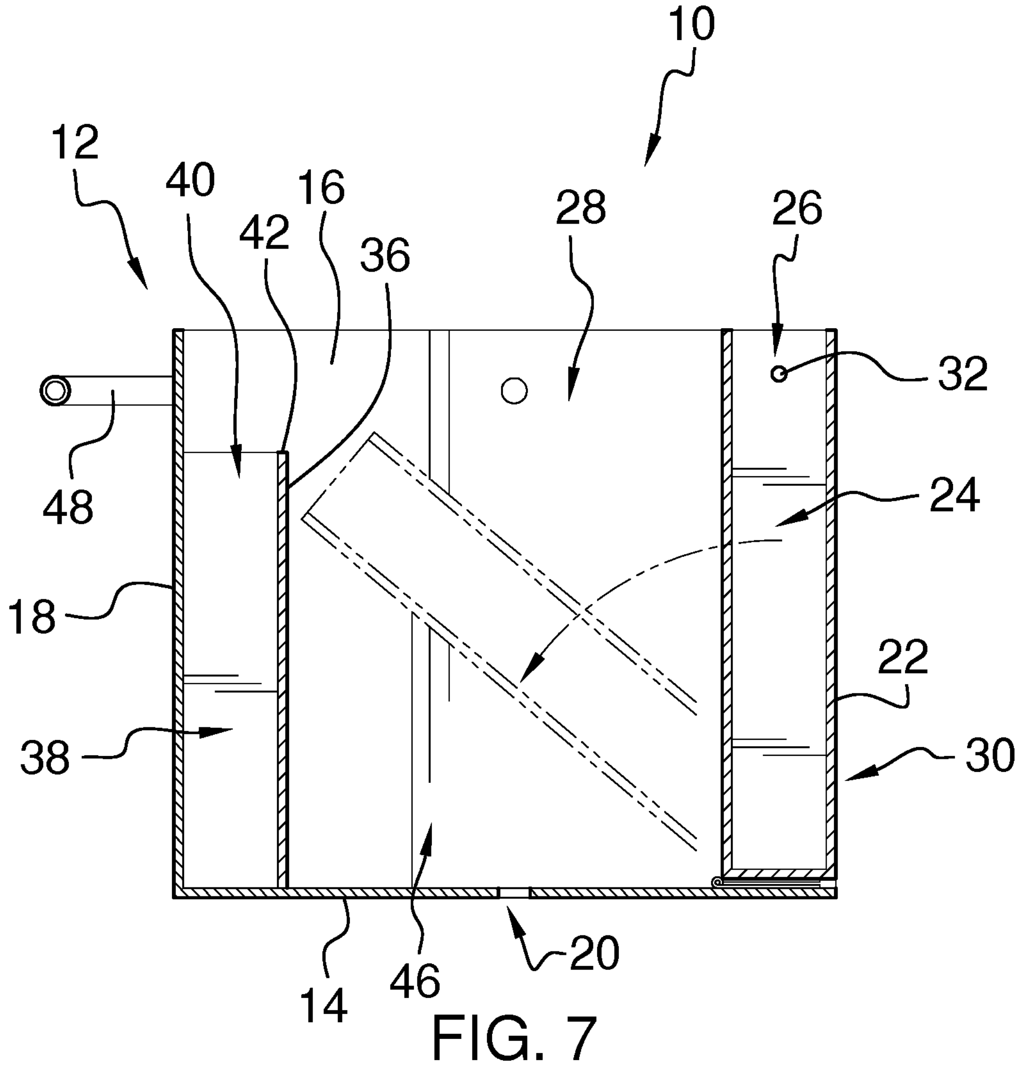
FIG. 7 is a cross-section view of an embodiment of the disclosure taken from Arrows 7-7 in FIG. 5.
Figure 8:
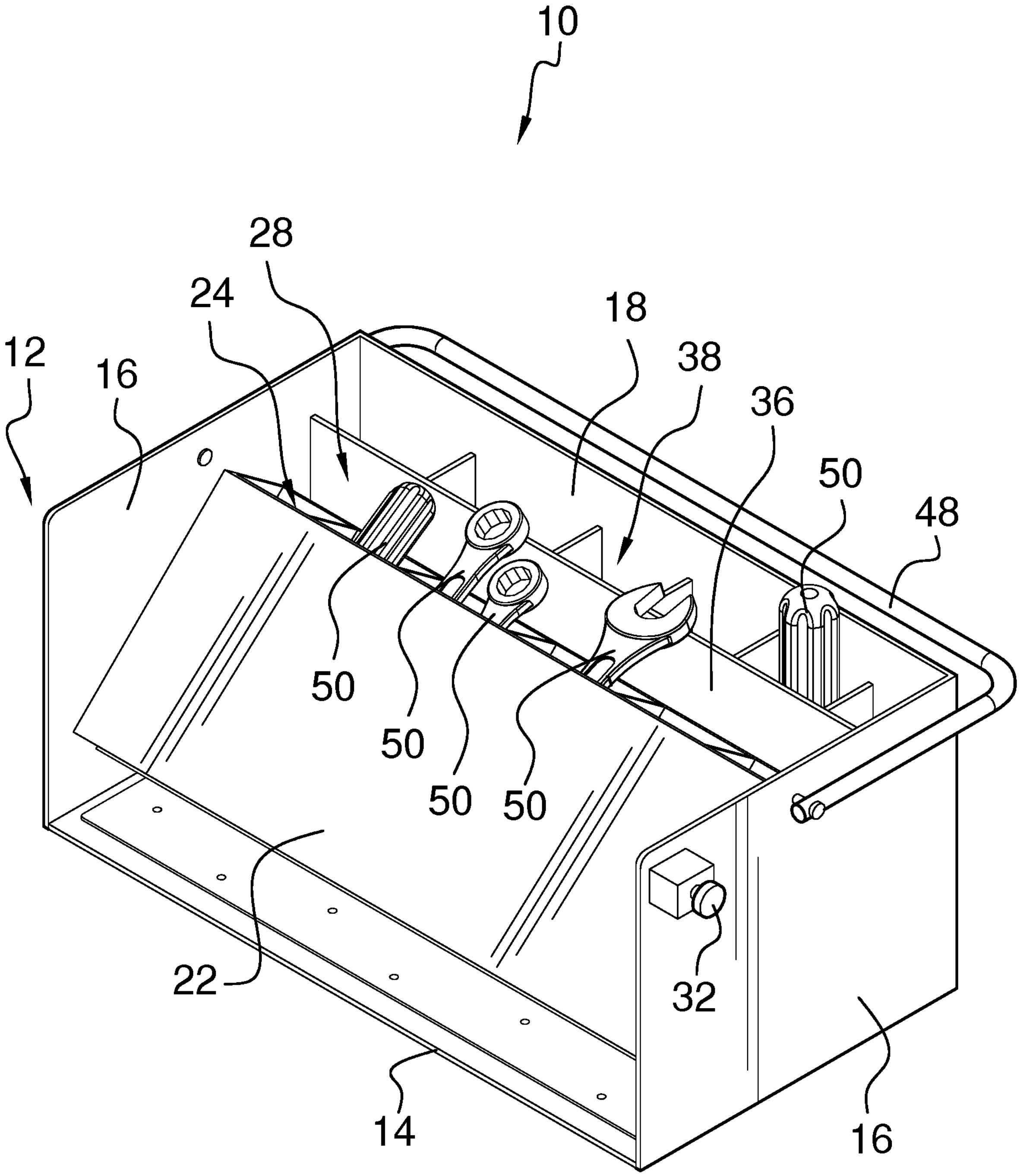
FIG. 8 is a top perspective view of an embodiment of the disclosure illustrating the pivoting holder pivoting rearwardly from the raised position.

With reference now to the drawings, and in particular to FIGS. 1 through 8 thereof, a new toolbox embodying the principles and concepts of an embodiment of the disclosure and generally designated by the reference numeral 10 will be described.

As best illustrated in FIGS. 1 through 8, the toolbox apparatus 10 generally comprises a container 12 having a base wall 14, a pair of lateral walls 16, and a rear wall 18. Each of the rear wall 18 and the pair of lateral walls 16 is coupled to and extends upwardly from the base wall 14. The rear wall 18 is also coupled to and extends between the pair of lateral walls 16. The base wall 14 has a plurality of drainage holes 20 extends therethrough.

A pivoting holder 22 is coupled to the container 12. The pivoting holder 22 is spaced forwardly of the rear wall 18 with respect to the container 12 and extends between the pair of lateral walls 16. The pivoting holder 22 defines a front slot 24 therein and has an open top 26. The front slot 24 has a size such that the pivoting holder 22 is configured for holding a plurality of elongated tools 50 in vertical orientations. The pivoting holder 22 and the rear wall 18 define an interior space 28 therebetween. The pivoting holder 22 is pivotable with respect to the container 12 and is positionable in a raised position 30 defined by the pivoting holder 22 extending vertically upwardly from the base wall 14. The pivoting holder 22 is pivotable rearwardly and downwardly with respect to the container 12 from the raised position 30 such that the pivoting holder 22 forms an acute angle between the base wall 14 the pivoting holder 22.

A locking pin 32 is engageable with the pivoting holder 22 and one of the pair of lateral walls 16 in a locking position to secure the pivoting holder 22 in the raised position 30. The locking pin 32 is biased toward the locking position. A plurality of front dividers 34 is positioned in the front slot 24 and is configured to facilitate distributing the plurality of elongated tools 50 along a width of the front slot 24 extending laterally with respect to the container 12.

An interior wall 36 is positioned in the interior space 28 and is spaced from the rear wall 18 of the container 12. The interior wall 36 and the rear wall 18 define a rear slot 38 therebetween which has an open upper end 40. The rear slot 38 has a size such that the rear slot 38 is configured for holding the plurality of elongated tools 50 in vertical orientations. A height of the interior wall 36 is less than a height of the rear wall 18 of the container 12 such that the open upper end 40 of the rear slot 38 is inset relative to a top edge 42 of the rear wall 18. A plurality of rear dividers 44 is positioned in the rear slot 38 and is configured to facilitate distributing the plurality of elongated tools 50 along a width of the rear slot 38 extending laterally with respect to the container 12.

The interior wall 36 and the pivoting holder 22 define a compartment 46 therebetween which has a depth of the compartment 46 taken between the pivoting holder 22 and the interior wall 36 is greater than a depth of the front slot 24 taken parallel to the depth of the compartment 46 and greater than a depth of the rear slot 38 taken parallel to the depth of the compartment 46. The compartment 46 also extends between the pair of lateral walls 16 of the container 12 A handle 48 is pivotally coupled to the pair of lateral walls 16 and is pivotable around a horizontal axis extending laterally through the container 12.

In use, the elongated tools 50 of the plurality of elongated tools 50 are stored in either the front slot 24 of the pivoting holder 22 or the rear slot 38. The pivoting holder 22 may be pivoted rearwardly and downwardly from the raised position 30 to lower a farthest extent of each one of a set of the plurality of elongated tools 50 that are held in the front slot 24. Pivoting the pivoting holder 22 in this manner enables the toolbox apparatus 10 to store more compactly and fit into shorter spaces than the toolbox apparatus 10 would otherwise be able to fit in while holding the set of the plurality of elongated tools 50. Because of this compacting action, the elongated tools 50 of the plurality of elongated tools 50 that are stored in the front slot 24 should be longer than the elongated tools 50 stored in the rear slot 38 to take full advantage of the compacting action. Other tools 52 which do not fit in either the front slot 24 or the rear slot 38 may be placed in the compartment 46 between the pivoting holder 22 and the interior wall 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A toolbox apparatus comprising:

a container comprising a base wall, a pair of lateral walls, and a rear wall, each of the rear wall and the pair of lateral walls being coupled to and extending upwardly from the base wall, the rear wall being coupled to and extending between the pair of lateral walls; and a pivoting holder being coupled to the container by a hinge attached to the pivoting holder and the base wall of the container such that the pivoting holder is pivotable relative to the base wall along a bottom edge of the pivoting holder, the pivoting holder being spaced forwardly of the rear wall with respect to the container and extending between the pair of lateral walls, the pivoting holder defining a front slot therein, the front slot having an open top, the front slot having a size such that the pivoting holder is configured for holding a plurality of elongated tools in vertical orientations, the pivoting holder and the rear wall defining an interior space therebetween, the pivoting holder being pivotable with respect to the container and being positionable in a raised position defined by the pivoting holder extending vertically upwardly from the base wall, the pivoting holder being pivotable rearwardly and downwardly with respect to the container from the raised position such that the pivoting holder forms an acute angle between the base wall the pivoting holder.

2. The apparatus of claim 1, wherein the base wall has a plurality of drainage holes extending therethrough.

3. The apparatus of claim 1, further comprising a locking pin being engageable with the pivoting holder and one of the pair of lateral walls in a locking position to secure the pivoting holder in the raised position.

4. The apparatus of claim 3, wherein the locking pin is biased toward the locking position.

5. The apparatus of claim 1, further comprising a plurality of front dividers being positioned in the front slot, the plurality of front dividers being configured to facilitate distributing the plurality of elongated tools along a width of the front slot extending laterally with respect to the container.

6. The apparatus of claim 1, further comprising an interior wall being positioned in the interior space and being spaced from the rear wall of the container, the interior wall and the rear wall defining a rear slot therebetween, the rear slot having an open upper end, the rear slot having a size such that the rear slot is configured for holding the plurality of elongated tools in vertical orientations.

7. The apparatus of claim 6, wherein a height of the interior wall is less than a height of the rear wall of the container such that the open upper end of the rear slot is inset relative to a top edge of the rear wall.

8. The apparatus of claim 6, further comprising a plurality of rear dividers being positioned in the rear slot, the plurality of rear dividers being configured to facilitate distributing the plurality of elongated tools along a width of the rear slot extending laterally with respect to the container.

9. The apparatus of claim 6, wherein the interior wall and the pivoting holder define a compartment therebetween, a depth of the compartment taken between the pivoting holder and the interior wall being greater than a depth of the front slot taken parallel to the depth of the compartment and greater than a depth of the rear slot taken parallel to the depth of the compartment, the compartment extending between the pair of lateral walls of the container.

10. The apparatus of claim 1, further comprising a handle being pivotally coupled to the pair of lateral walls, the handle being pivotable around a horizontal axis extending laterally through the container.

11. A toolbox apparatus comprising:

a container comprising a base wall, a pair of lateral walls, and a rear wall, each of the rear wall and the pair of lateral walls being coupled to and extending upwardly from the base wall, the rear wall being coupled to and extending between the pair of lateral walls, the base wall having a plurality of drainage holes extending therethrough;

a pivoting holder being coupled to the container by a hinge attached to the pivoting holder and the base wall of the container such that the pivoting holder is pivotable relative to the base wall along a bottom edge of the pivoting holder, the pivoting holder being spaced forwardly of the rear wall with respect to the container and extending between the pair of lateral walls, the pivoting holder defining a front slot therein, the front slot having an open top, the front slot having a size such that the pivoting holder is configured for holding a plurality of elongated tools in vertical orientations, the pivoting holder and the rear wall defining an interior space therebetween, the pivoting holder being pivotable with respect to the container and being positionable in a raised position defined by the pivoting holder extending vertically upwardly from the base wall, the pivoting holder being pivotable rearwardly and downwardly with respect to the container from the raised position such that the pivoting holder forms an acute angle between the base wall the pivoting holder;

a locking pin being engageable with the pivoting holder and one of the pair of lateral walls in a locking position to secure the pivoting holder in the raised position, the locking pin being biased toward the locking position;

a plurality of front dividers being positioned in the front slot, the plurality of front dividers being configured to facilitate distributing the plurality of elongated tools along a width of the front slot extending laterally with respect to the container;

an interior wall being positioned in the interior space and being spaced from the rear wall of the container, the interior wall and the rear wall defining a rear slot therebetween, the rear slot having an open upper end, the rear slot having a size such that the rear slot is configured for holding the plurality of elongated tools in vertical orientations, a height of the interior wall being less than a height of the rear wall of the container such that the open upper end of the rear slot is inset relative to a top edge of the rear wall;

a plurality of rear dividers being positioned in the rear slot, the plurality of rear dividers being configured to facilitate distributing the plurality of elongated tools along a width of the rear slot extending laterally with respect to the container;

wherein the interior wall and the pivoting holder define a compartment therebetween, a depth of the compartment taken between the pivoting holder and the interior wall being greater than a depth of the front slot taken parallel to the depth of the compartment and greater than a depth of the rear slot taken parallel to the depth of the compartment, the compartment extending between the pair of lateral walls of the container; and a handle being pivotally coupled to the pair of lateral walls, the handle being pivotable around a horizontal axis extending laterally through the container.

* * * * *